United States Patent [19]
Darvial et al.

[11] 4,448,175
[45] May 15, 1984

[54] FUEL APPARATUS

[76] Inventors: Bruce L. Darvial, 2754 Hollister Cir.; Phillip L. Heintz, 7405 Castle Rock Lake Dr.; John S. Smith, P.O. Box 1674; Lee A. Walth, P.O. Box 608, all of Colstrip, Mont. 59323

[21] Appl. No.: 460,372
[22] Filed: Jan. 24, 1983
[51] Int. Cl.³ .................................. F02M 31/00
[52] U.S. Cl. ........................ 123/557; 123/525; 123/523
[58] Field of Search ............... 123/522, 523, 524, 525, 123/557, 575, 578

[56] References Cited
U.S. PATENT DOCUMENTS

| 3,713,429 | 1/1973 | Dwyre | 123/557 |
|---|---|---|---|
| 4,336,783 | 6/1982 | Henson | 123/557 |
| 4,349,002 | 9/1982 | Allen | 123/557 |
| 4,350,134 | 9/1982 | Sparks | 123/557 |
| 4,398,523 | 8/1983 | Henson | 123/557 |

Primary Examiner—Ronald H. Lazarus
Attorney, Agent, or Firm—Arthur L. Urban

[57] ABSTRACT

Fuel apparatus including a fuel vaporizing portion, an air conveying portion, a heating portion and a flow control portion; the fuel vaporizing portion including an enclosed chamber, the chamber including a liquid reservoir section and a vapor expansion section, the vapor expansion section including a plurality of baffles providing a tortuous path through the expansion section, a liquid fuel inlet to the chamber and a vapor outlet from the chamber, a first vapor conduit connecting the chamber outlet with a carburetor of an engine, a second vapor conduit connecting the engine carburetor with the chamber adjacent the vapor expansion section thereof; the air conveying portion including an air intake section, a divider for air flowing through the air intake section, a first duct for conveying one part of the air flow to a point adjacent the liquid reservoir section of the enclosed chamber, a second duct for conveying a second part of the air flow to the first vapor conduit; the heating portion being disposed adjacent the enclosed chamber, the air ducts and a vapor conduit; the flow control portion including an adjustable damper located in the second air duct, the damper providing a more open path through the second air duct when the engine is idling or decelerating and providing a more closed path when the engine is accelerating.

14 Claims, 5 Drawing Figures

FUEL APPARATUS

This invention relates to a novel apparatus for combustion devices and more particularly relates to a new apparatus for fuel used with combustion devices.

Combustible materials have been burned through the years for a variety of purposes. Materials such as wood, coal, oil, gasoline, natural gas, liquified propane gas and the like have been burned under many different conditions. Frequently, fuels are burned to provide heat. Some fuels such as gasoline and oil are used to power vehicles, e.g. cars, trucks, tractors and other motorized equipment.

When fuels were inexpensive, fuel users were not greatly concerned about their fuel costs. Instead, people were more concerned about the amount of power that they could obtain from a particular piece of equipment. For example, with vehicles, people were concerned about the speed that could be achieved by a vehicle or the torque obtainable from the vehicle engine.

As fuels have become much more costly with the recent multifold price increases, many individuals have become increasingly concerned about fuel expenses. In the case of vehicles, owners have reduced the amount that they use their vehicles. Also, many individuals have traded their older vehicles for others that are smaller in size and/or weight to reduce fuel costs.

Although these expedients have provided a reduction in fuel consumption, continuing increases in the price of fuel have caused many people to direct considerable attention toward finding additional ways of further reducing the consumption of fuel. However, these efforts have had only limited success.

Vehicle owners cannot purchase smaller and smaller vehicles. At some size, a vehicle loses its utility for the owner's purposes. Thus, each owner is only willing to accept a certain minimum size vehicle.

As a result, major efforts are being made to analyze the design and operating characteristics of engines in an attempt to improve the combustion efficiency of such devices. While these efforts have produced some improvements, there still is a critical need for further improvements in the fuel efficiency of combustion devices.

One of the problems with many of the ideas proposed to date is that they require the expenditures of large amounts of money to achieve the benefits thereof. Most necessitate the purchase of new equipment or the extensive modification of existing equipment. Although it may be possible or justifiable to take such radical measures in a limited number of cases, for many situations such actions cannot be justified.

Another factor that has limited the acceptance of some new devices for improving fuel consumption of engines is that many devices are only useful under certain operating conditions. For example, the devices may be beneficial only if the operator is willing to accept limitations on acceleration, torque and similar performance characteristics.

From the above discussion, it is clear that previous devices for improving the fuel consumption of engines have left much to be desired. As a result, many persons have had to accept compromise solutions in attempts to improve their fuel consumption.

The present invention provides a novel apparatus for reducing the fuel consumption of engines. The fuel apparatus of the invention provides an inexpensive means for achieving this reduction in fuel consumption. The apparatus can be used with different types of engines operating under a wide variety of conditions. Acceleration and power are not sacrificed with the apparatus of the invention. Engine wear and emissions also are reduced.

The fuel apparatus of the present invention is simple in design and relatively small in size. The apparatus can be mounted on an engine conveniently within the space limitations encountered under the hood of a vehicle. The apparatus can be installed on an engine after only a minimum of instruction without special tools or skills. The apparatus is durable in construction and has a long useful life with little maintenance.

The fuel apparatus is used by a vehicle operator without changing his normal driving procedures. The apparatus can function automatically without attention from the driver if desired.

The apparatus can be fabricated from commercially available materials and components. Conventional metal working techniques and procedures and semi-skilled labor can be employed in its manufacture.

These and other benefits and advantages of the novel fuel apparatus of the present invention will be apparent from the following description and the accompanying drawings in which.

Figure 1:
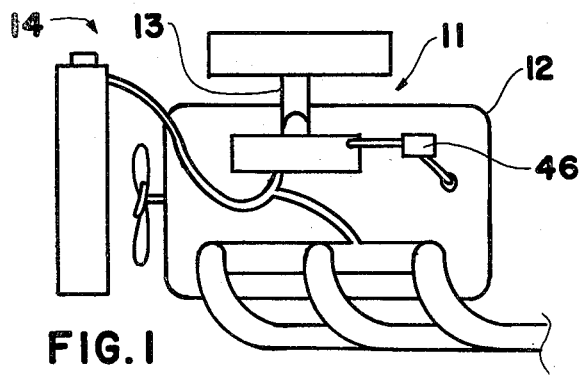
FIG. 1 is a schematic side elevation of one form of fuel apparatus of the invention mounted on an engine.
Figure 3:
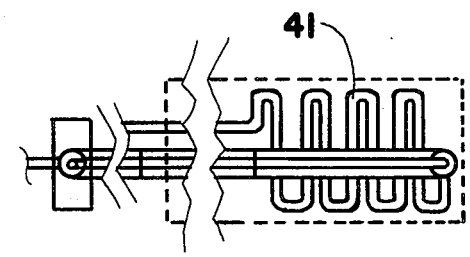
FIG. 3 is a fragmentary sectional view of the fuel apparatus shown in FIGS. 1 and 2 taken along line 3—3 thereof.
Figure 2:
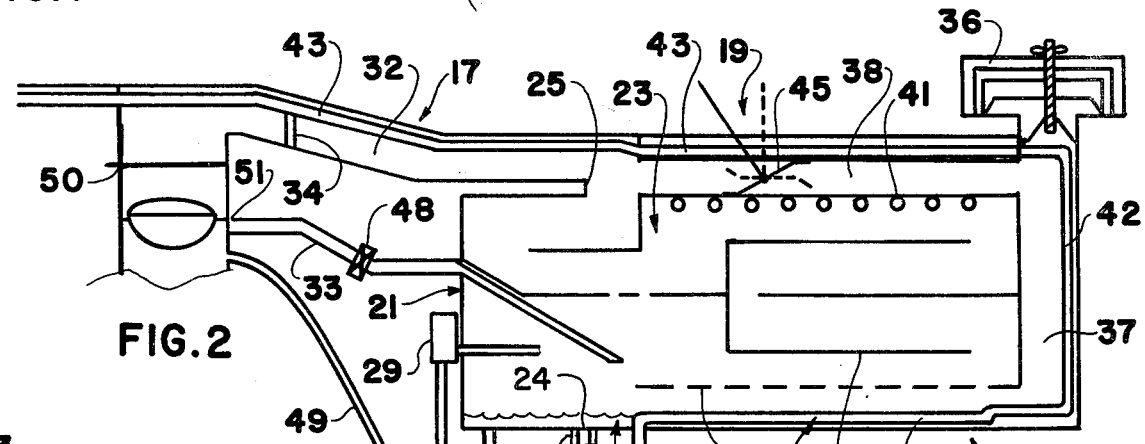
FIG. 2 is an enlarged side view in section of the fuel apparatus shown in FIG. 1.

As shown in the FIGS. 1-3 of the drawings, one form of fuel apparatus 11 of the present invention is mounted on an engine 12 including a carburetor 13. The fuel apparatus 11 is mounted in the engine compartment of a vehicle 14 and operatively connected to the carburetor 13.

The fuel vaporizing portion 16 of the apparatus 11 of the invention includes an enclosed chamber 21. The enclosed chamber 21 includes a liquid reservoir section 22 and a vapor expansion section 23. The chamber 21 of the fuel vaporizing portion 16 also includes a liquid fuel inlet 24 and a vapor outlet 25.

Advantageously, the liquid reservoir section 22 is located below the expansion section 23. The fuel vaporizing portion 16 preferably includes porous barrier means such as perforated plate 27 disposed between the liquid reservoir section 22 and the vapor expansion section 23.

The vapor expansion section 23 includes a plurality of baffle means 28. The baffles 28 provide a tortuous path through the expansion section for the vapor passing therethrough.

In addition, the fuel vaporizing portion 16 advantageously includes pump means 29 for supplementing fuel to the liquid reservoir section 22 of the enclosed chamber 21. Preferably, magnet means 30 is disposed adjacent to the fuel inlet 24 of the chamber 21.

The fuel vaporizing portion 16 includes first vapor conduit means 32. The first vapor conduit 32 connects the chamber outlet 25 with the inlet of carburetor 13 of the engine 12. A second vapor conduit means 33 connects the carburetor 13 with the chamber 21. The connection of the second conduit 33 with the chamber 21 is at a point in the chamber adjacent the vapor expansion section 23.

The first vapor conduit 32 advantageously is of a cross-sectional size at least about as large as the inlet of the carburetor 13. Preferably, the first conduit 32 is of a cross-sectional size significantly larger than the second conduit 33. In a preferred construction, the first conduit 32 also includes backfire inhibiting means such as screen assembly 34.

The air conveying portion 17 of the fuel apparatus 11 of the invention includes an air intake section 36. Means also are included for dividing air flowing through the air intake section 36. This may be accomplished as shown in the drawings by providing first and second duct means 37 and 38 respectively.

The first duct 37 conveys one part of the air flowing through the air intake 36. The first duct 37 conveys the air moving therethrough to a point adjacent the surface of the liquid in reservoir section 22 of chamber 21. The second duct 38 conveys a second part of the air flowing from air intake 36 to the first vapor conduit 32.

The heating portion 18 of the apparatus 11 is disposed adjacent the enclosed chamber 21. The heating media may be a heated liquid coolant of the engine or may be cooled exhaust gases exiting from the engine. Likewise, electrical heaters may be employed for heating media.

Advantageously, the heating portion includes conduit means for circulating a heated fluid such as the coolant or exhaust. The conduits may be disposed within the chamber 21, the first vapor conduit 32 and the air ducts 37 and 38. The heating conduits can be interconnected as shown in FIGS. 1–3 to form a continuous heating loop through the apparatus 11.

Heating conduit coils 40 and 41 preferably are disposed within the chamber 21 adjacent the upper and lower sections thereof. Likewise, conduit lengths 42 and 43 may extend within the air ducts 37 and 38 respectively. Also, heating conduit 43 may extend along the first vapor conduit 32.

The flow control portion 19 of the fuel apparatus 11 includes adjustable damper means 45. The damper means 45 is located in the second air duct 38. The damper 45 provides a more open path through the second air duct 38 when the engine 12 is idling and a more closed path when the engine is operating under load or accelerating.

The damper means 45 advantageously is operatively connected to vacuum responsive means 46. The vacuum means 46 is responsive to changes in the vacuum level of the engine 12. The vacuum responsive means 46 may be a unit similar to a vacuum brake assembly that translates differences in vacuum level into movement of a mechanical arm or linkage. Changes in engine vacuum occur during the operation thereof with the greatest vacuum when the engine is idling or decelerating. The lowest level of vacuum is present when the engine is accelerating.

The flow control portion 19 also advantageously includes valve means 47 associated with the fuel line 49 of the apparatus and valve means 48 associated with the second vapor conduit 33. Such valve means may include electrical solenoids or mechanical valves as desired.

In the use of the fuel apparatus 11 of the present invention, the apparatus first is mounted on an engine 12. Chamber 21 of the vaporizing portion 16 is mounted under the hood of a vehicle (not shown). The chamber may be positioned to the side of the engine and secured such as on the inside surface of a fender.

The fuel line 49 and the discharge end 50 of the first vapor conduit 25 are connected to the carburetor 13. Also, the second vapor conduit 33 is connected to the carburetor base vacuum port 51. The fuel apparatus 11 now is ready for use.

A driver starts the engine 12 in the regular manner with the carburetor and fuel system functioning normally. Air passes into the carburetor from air intake 36, through air duct 38 and conduit 32 with damper 45 being open. Fuel enters the carburetor 13 through line 49.

When the engine has operated for a few minutes, the coolant and exhaust gases will be at an elevated temperature (above about 105° F.) and the selected heating media will be heating the apparatus 11. At that time, valves 47 and 48 can be changed by the driver or more preferably automatically. Opening valve 47 meters liquid fuel into the apparatus 11 instead of directly into the carburetor. Likewise, opening valve 48 allows fuel vapor to enter the carburetor vacuum port 51.

Fuel entering chamber 21 will be vaporized by the heat and combine with air from first air duct 37. The resulting mixture will follow the tortuous path around baffles 28 through the expansion section 23 of the chamber 21. Liquid entrapped in the mixture will settle therefrom and return to the fuel reservoir section 22 in the bottom of the chamber. The vapor mixture will pass from outlet 25 of the chamber and into first vapor conduit 32 and therealong to the carburetor 13.

During idling of the engine, when the vacuum level of the engine is greatest, damper 45 will be more open so that most of the air will pass through duct 38 and a minimum through duct 37. Under these conditions, a minimum of vapor will enter conduit 32 and the carburetor. Instead, fuel vapor will move through second vapor conduit 33 into the carburetor 13 and combine the air entering from duct 38 to provide the fuel to keep the engine operating.

When the engine 12 is accelerating, the vacuum level of the engine will decrease so the vacuum responsive unit 46 will cause damper 45 to close to a greater degree. This action causes the air entering air intake 36 to be diverted to a greater extent through air duct 37 and thus through the chamber 21. This increased volume of air passing through the chamber causes more fuel to be vaporized and thus transfers vapor to the carburetor more rapidly. This increase allows the engine to accelerate efficiently. To further increase vaporization, pump 29 can circulate controlled amounts of fuel from reservoir section 22 into expansion section 23. Operation of pump 29 may be varied by a potentiometer (not shown) connected to vacuum responsive means 46.

Upon reaching desired engine speed, acceleration will cease and the vacuum level of the engine will increase again. The vacuum responsive unit 46 sensing this change will cause the damper 45 to be opened more, decreasing the volume of air moving through chamber 21 and decreasing the amount of vapor entering the carburetor.

This sequence is repeated each time the vacuum level of the engine is changed by acceleration or deceleration of the engine. The resulting opening of the damper 45 to a greater or lesser extent automatically provides the required amount of fuel vapor for efficient functioning of the engine under the widely varying conditions encountered in normal engine operation.

Figure 4:
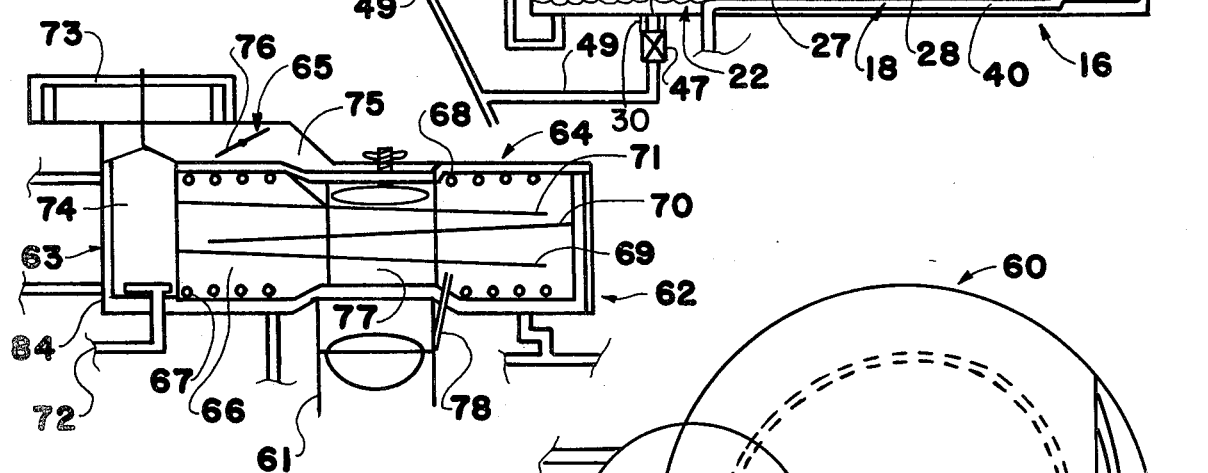
FIG. 4 is a side view in section of another form of the fuel apparatus of the invention mounted on an engine.
Figure 5:
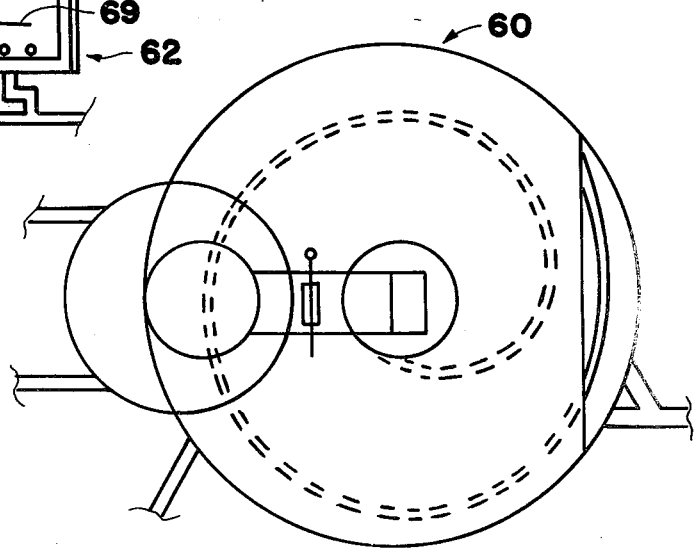
FIG. 5 is a sectional view of the fuel apparatus shown in FIG. 4 taken along line 5—5 thereof.

The fuel apparatus 60 shown in FIGS. 4 and 5 of the drawings is similar to apparatus 11 described above. The design of the fuel apparatus 60 permits it to be mounted directly over carburetor 61 in place of the conventional air cleaner.

The fuel apparatus 60 includes a fuel vaporizing portion 62, an air conveying portion 63, a heating portion 64 and a flow control portion 65. An enclosed chamber 66 includes upper and lower heating conduit coils 67 and 68. The chamber 66 also includes baffles 69, 70 and 71 providing a tortuous vapor path through chamber 66. Chamber 66 has a liquid fuel inlet 72. If desired, the fuel may be heated and/or partially vaporized in a separate heating unit (not shown) prior to introduction into chamber 66.

The fuel apparatus 60 further includes an air intake 73, a first air duct 74 and a second air duct 75 with a vacuum regulated damper 76. First vapor conduit 77 is aligned with the axis of chamber 66 and second vapor conduit 78 connects the chamber 66 with the carburetor 61.

The fuel apparatus 60 is used in the same way as apparatus 11 described above. The apparatus 60 is mounted directly on the carburetor 61 and the heating media and fuel conduits connected thereto. The fuel apparatus 60 operates in the same way as the apparatus 11.

The engine is started employing the regular fuel system. After the coolant or exhaust gas has heated the apparatus 60, suitable valves (not shown) are activated, diverting liquid fuel into the apparatus. The liquid fuel vaporizes and moves upwardly through the expansion section around the baffles 69–71 which are inclined slightly to allow entrained liquid to drain back to the liquid reservoir section of the chamber.

Air enters intake 73 and passes predominently through duct 74 or 75 depending upon the orientation of the adjustable damper 76. If the damper 76 is predominately closed such as when the engine is accelerating, air will flow through duct 74 and into the chamber 66 to carry vaporized fuel through vapor conduit 77 into the carburetor 61.

However, if the engine is idling or decelerating, damper 76 will be more open and a lesser amount of vapor will pass through vapor conduit 77. Instead, air will pass through duct 75 and into the carburetor 16 where it will mix with vapor from small vapor conduit 78 connected directly to the chamber.

The above description and the accompanying drawings show that the present invention provid as a novel apparatus for reducing the fuel consumption of engines. The apparatus of the invention is suitable for use with different types of engines operating under a wide variety of conditions. The apparatus enhances fuel economy while reducing engine wear and pollution.

The fuel apparatus of the invention is relatively inexpensive to manufacture. Commercially available materials and components can be used in its fabrication. Conventional metal working techniques and procedures can be employed in its manufacture.

The apparatus can be installed easily by a mechanic after a minimum of instruction. The apparatus can be mounted on an engine within the space limitations encountered under the hood of a vehicle. The apparatus is durable in construction and has a long useful life with a minimum of maintenance.

A vehicle operator can utilize the apparatus of the invention without changing his normal driving procedures. The apparatus can function automatically without supervision by the driver.

It will be apparent that various modifications can be made in the particular fuel apparatus described in detail above and shown in the drawings within the scope of the invention. The size, configuration and arrangement of components can be changed to meet specific requirements. The controls of the apparatus can be automatic or manual as desired and may include computers. These and other changes in the apparatus can be made provided the functioning and operation thereof are not adversely affected. Therefore, the scope of the invention is to be limited only by the following claims.

What is claimed is:

1. Fuel apparatus including a fuel vaporizing portion, an air conveying portion, a heating portion and a flow control portion; said fuel vaporizing portion including an enclosed chamber, said chamber including a liquid reservoir section and a vapor expansion section, said vapor expansion section including a plurality of baffle means providing a tortuous path through said expansion section, a liquid fuel inlet to said chamber and a vapor outlet from said chamber, first vapor conduit means connecting said chamber outlet with a carburetor of an engine, second vapor conduit means connecting said engine carburetor with said chamber adjacent said vapor expansion section thereof; said air conveying portion including an air intake section, means for dividing air flowing through said air intake section, first duct means for conveying one part of said air flow to a point adjacent said liquid reservoir section of said enclosed chamber, second duct means for conveying a second part of said air flow to said vapor conduit means; said heating portion being disposed adjacent said enclosed chamber, said air duct means and said vapor conduit means; said flow control portion including adjustable damper means located in said second air duct means, said damper means providing a more open path through said second air duct means when said engine is idling or decelerating and providing a more closed path when said engine is accelerating; whereby liquid fuel is vaporized in said enclosed chamber, mixed with heated air and selectively delivered to said carburetor with a second vapor source and a second air source being delivered independently to said carburetor when said heated vapor/air mixture is not being delivered in significant quantities, said selective delivery being in response to changes in the vacuum level of said engine.

2. Fuel apparatus according to claim 1 wherein said fuel vaporizing portion is located adjacent to said engine.

3. Fuel apparatus according to claim 1 wherein said fuel vaporizing portion is positioned directly above said carburetor of said engine.

4. Fuel apparatus according to claim 1 wherein said liquid reservoir section of said enclosed chamber is located below said expansion section thereof.

5. Fuel apparatus according to claim 1 wherein said fuel vaporizing portion includes porous barrier means disposed between said liquid reservoir section and said vapor expansion section of said enclosed chamber.

6. Fuel apparatus according to claim 1 wherein said fuel vaporizing portion includes pump means for circulating liquid fuel into said vapor expansion section of said enclosed chamber.

7. Fuel apparatus according to claim 1 wherein said fuel vaporizing portion includes magnet means adjacent to said liquid fuel inlet of said enclosed chamber.

8. Fuel apparatus according to claim 1 wherein said first vapor conduit means is of a cross-sectional size at least about as large as said carburetor fuel inlet.

9. Fuel apparatus according to claim 1 wherein said first vapor conduit means is of a cross-sectional size significantly larger than said second vapor conduit means.

10. Fuel apparatus according to claim 1 wherein said first vapor conduit means includes backfire inhibiting means.

11. Fuel apparatus according to claim 1 wherein said heating portion includes conduit means disposed within said enclosed chamber, said air duct means and said vapor conduit means.

12. Fuel apparatus according to claim 1 wherein said conduit means of said heating portion is connectable to a liquid cooling system of said engine.

13. Fuel apparatus according to claim 1 wherein said conduit means of said heating portion is connectable to an exhaust gas system of said engine.

14. Fuel apparatus according to claim 1 wherein said damper means is operatively connected to vacuum level sensing means responsive to changes in the vacuum of said engine.

* * * * *